March 17, 1931.  S. C. WATSON  1,796,352
AUTOMATIC TAPPING HEAD
Filed Aug. 14, 1929   3 Sheets-Sheet 1
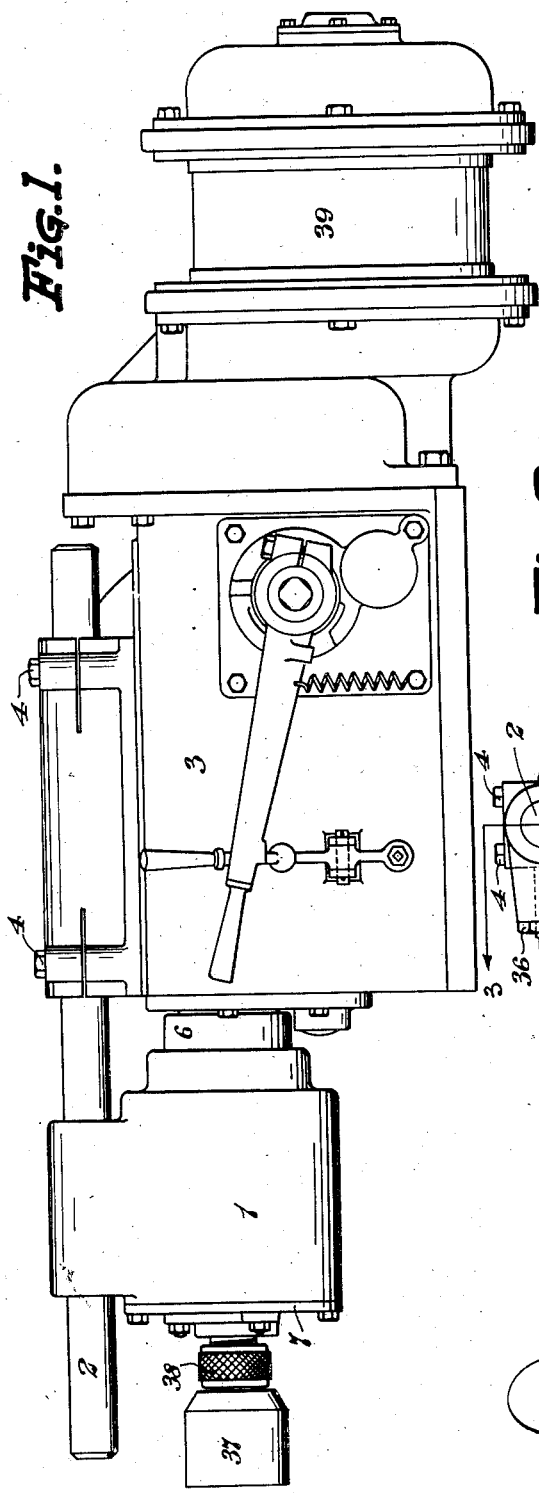
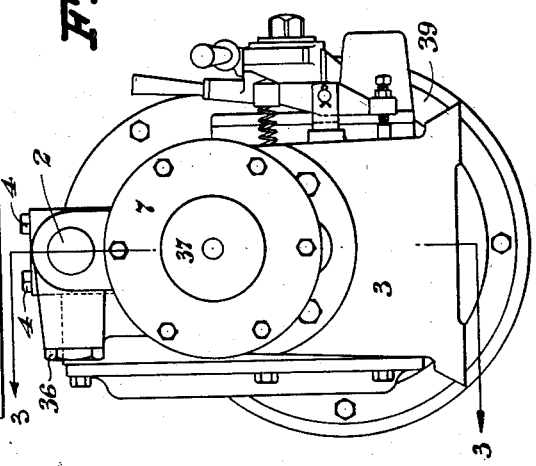
INVENTOR.
Sydney C. Watson
BY James N. Ramsey
ATTORNEY.

March 17, 1931. S. C. WATSON 1,796,352
AUTOMATIC TAPPING HEAD
Filed Aug. 14, 1929 3 Sheets-Sheet 2
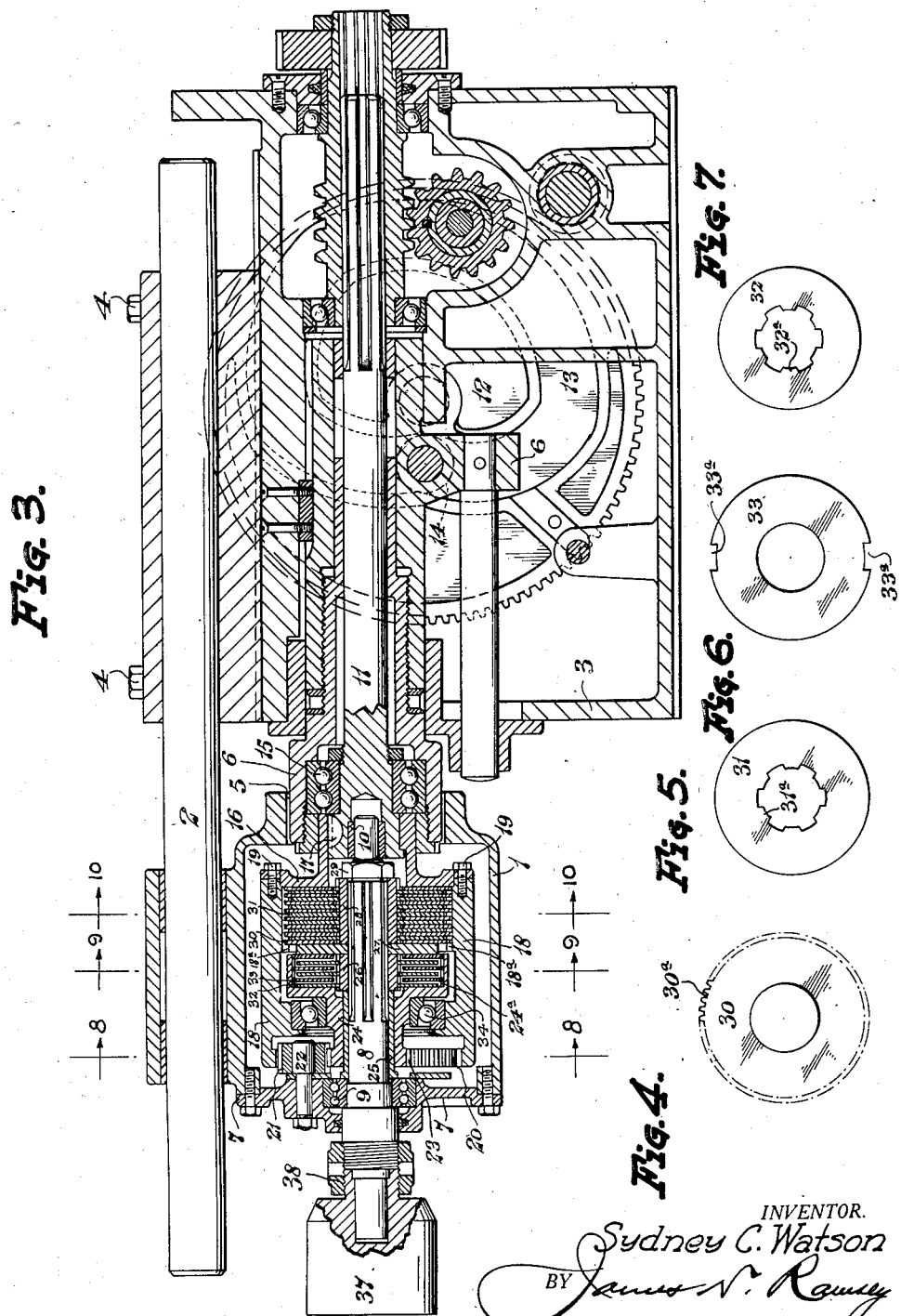
INVENTOR.
Sydney C. Watson
BY
ATTORNEY.

March 17, 1931. S. C. WATSON 1,796,352
AUTOMATIC TAPPING HEAD
Filed Aug. 14, 1929 3 Sheets-Sheet 3

INVENTOR.
Sydney C. Watson
BY James N. Ramsey
ATTORNEY.

Patented Mar. 17, 1931

1,796,352

UNITED STATES PATENT OFFICE

SYDNEY C. WATSON, OF CHICAGO, ILLINOIS, ASSIGNOR TO THE BRADFORD MACHINE TOOL COMPANY, OF CINCINNATI, OHIO, A CORPORATION OF OHIO

AUTOMATIC TAPPING HEAD

Application filed August 14, 1929. Serial No. 385,748.

This invention relates to mechanism for controlling the drive of chuck spindles such, for example, as used in connection with tapping heads which are required to be rotated in a clockwise or anti-clockwise direction during the tapping cycle and in an anti-clockwise or clockwise direction during the time of removing the tap from the threaded hole. The problem of driving tapping heads of this nature is one of long standing and various solutions thereof have been proposed, most of which involve a complication of parts making them costly to manufacture. Others require niceties of adjustment rendering them troublesome and unreliable for day-in-and-day-out operation.

The present invention has for an object to provide simple and reliable driving means for a chuck spindle which will rotate said spindle in a clockwise or anti-clockwise direction during the "tapping cycle" and which will automatically reverse the rotation of said spindle during the "withdrawing cycle" of the tap.

Other objects of the invention are to provide a tapping unit, as above described, which is efficient, convenient and compact in design.

The invention is disclosed as embodied on an automatic drill head of the type described in my copending application, Serial No. 311,698, filed October 10, 1928.

A machine of this type was devised by me for drilling purposes, but with a change of the feed cam I am enabled to mount my improved tapping head on the end of the drill spindle and use the positive feed obtained from said cam to rapidly advance the tapping head towards the work, advance said head at the proper speed for tapping, withdraw the tap at the proper speed, and rapidly return the head to the starting point.

Referring to the drawings:

Fig. 1 is a side elevation of a drill head embodying my invention;

Fig. 2 is a front end elevation of the same;

Fig. 3 is a longitudinal section on the line 3—3 of Fig. 2, the driving motor being omitted;

Fig. 4 is a detail view of one of the disc plates 30;

Fig. 5 is a detail view of one of the disc plates 31;

Fig. 6 is a detail view of one of the disc plates 33;

Fig. 7 is a detail view of one of the disc plates 32.

Figure 8:
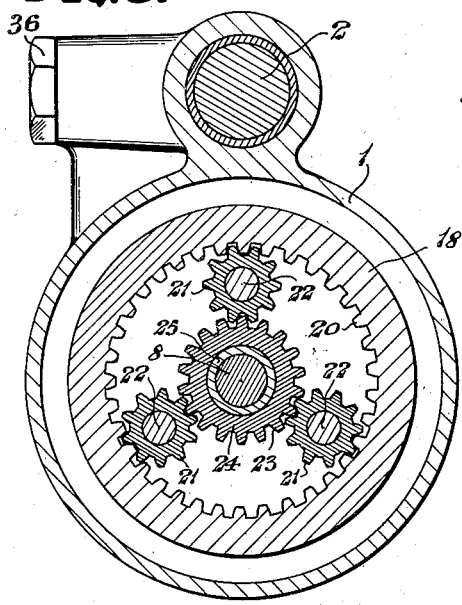
Fig. 8 is a cross section on the line 8—8 of Fig. 3.

The following detailed description is for the purpose of disclosing a specific embodiment of the invention and is not to be construed in a limiting sense.

My invention, which is shown mounted upon a drill head constructed in accordance with said copending application comprises a housing 1, slidably supported upon guide bar 2, the latter being rigidly attached to bed 3 by bolts 4. One end of housing 1 is provided with an opening 5 into which the quill 6 extends, and the other end of said housing 1 is closed by housing head 7.

One end of chuck spindle 8 is rotatably mounted in bearing 9 and the other end is reduced and journaled within the bushing 10 carried by the outer end of the spindle shaft 11.

The means for rotating the feed cam 12 and the spindle shaft 11 is the same as described in my said copending application and as it forms no part of the present invention, its description will not be repeated here.

Figure 11:
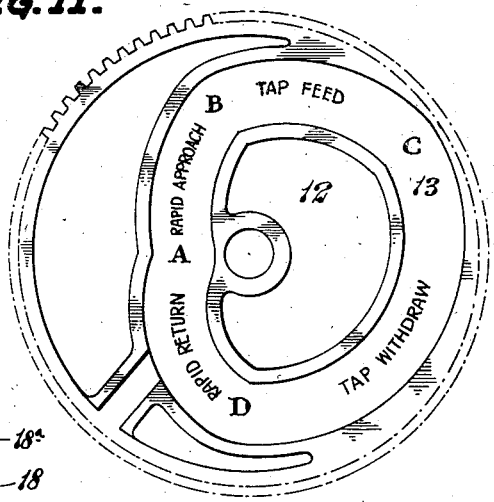
Fig. 11 is a detail view of the feed cam shown partly by dotted lines.

Assuming, however, that the feed cam 12 and spindle shaft 11 are rotated, the irregular cam track 13 will cause the roller 14 (carried by quill 6) to be moved lengthwise within bed 3, as follows:

Referring to Fig. 11, that portion of the cam track 13, between the points A and B produces the "rapid approach" of the tap towards the work, the portion between the points B and C produces the "tap feed,"

the portion between the points C and D produces the "tap withdrawn" and the portion between the points D and A the "rapid return" of the tap to its starting position.

Therefore, it will be clearly seen that the outward movement of roller 14 will cause the quill 6 to have a corresponding movement and the inward movement of quill 6 will be the same as the inward movement of roller 14.

The outer end of spindle shaft 11 is journaled within bearing 15 (Fig. 3) and is securely fixed to cover 16 by a key 17. Said cover 16 supports the compound internal gear 18 by being rigidly attached thereto by bolts 19. Said internal gear 18 is provided with teeth 20, which teeth are in permanent engagement with the reverse idler gears 21. There are three of the idler gears 21 (as shown in Fig. 8) and they are rotatably mounted upon studs 22 carried by housing head 7, as clearly shown in Fig. 3.

Said idler gears 21 are also in permanent mesh with external teeth 23, integrally formed upon the compound external gear and clutch member 24. Said compound gear and clutch 24 is rotatably mounted upon sleeve 25, which sleeve is received over chuck spindle 8 and fits between the inner race of ball bearing 9 and bushing 26. Washer 27 is received over chuck spindle 8 and fits between bushing 26 and bushing 28. Said bushings 26—28 and washer 27, respectively, are all splined upon chuck spindle 8 and held against sleeve 25 by lock nut 29, as clearly shown in Fig. 3.

30 designates a series of disc plates each having its outer periphery provided with teeth 30a which teeth permanently mesh with the internal teeth 18a of internal compound gear 18, and 31 designates a series of disc plates each having internal teeth 31a adapted to permanently mesh with external teeth 28a of bushing 28, said plates 30 and 31 being alternated, as shown in Fig. 3.

32 designates a series of disc plates having internal teeth 32a adapted to permanently mesh with external teeth 26a of bushing 26, while 33 designates a series of disc plates provided with notches 33a, which notches permanently receive the bars 24a integrally formed upon the compound external gear and clutch member 24. Said discs 32—33 are also alternated as are the discs 30—31.

A bearing 34 is inserted between the compound external gear and clutch member 24 and compound internal gear 18, as shown in Fig. 3.

Figure 9:
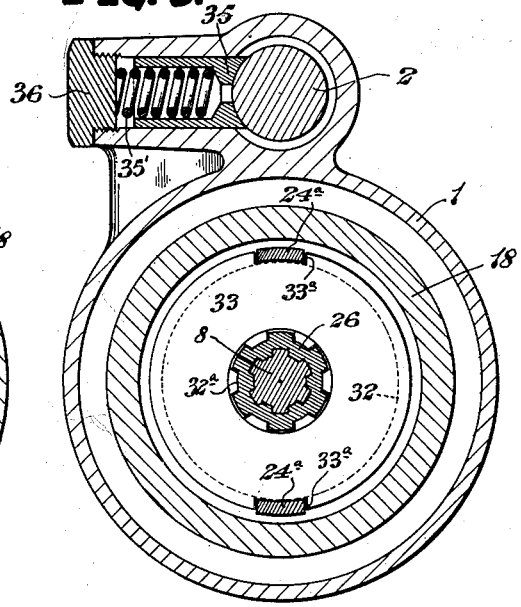
Fig. 9 is a cross section on the line 9—9 of Fig. 3.
Figure 10:
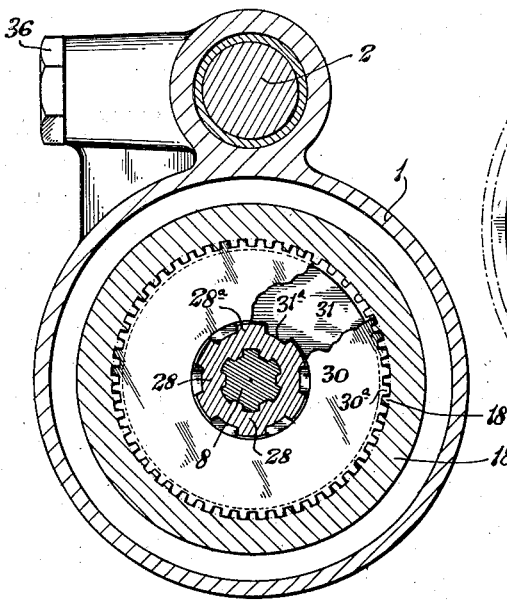
Fig. 10 is a cross section on the line 10—10 of Fig. 3.

In order to properly engage the friction discs 30 with friction discs 31 when the quill 6 is moved in an outward direction relative to the bed or frame 3 and to properly disengage said discs 30—31 and to engage friction discs 32—33 when said quill 6 is moved in a reverse direction it is necessary to have means for holding the housing 1 stationary relative to the guide bar 2 until said discs are fully engaged or disengaged, as the case may be. This means for holding the housing 1 stationary upon the guide bar 2 comprises a drag plunger 35 which is adapted to be forced against the guide bar 2 by coil spring 35', as clearly shown in Fig. 9. The tension of coil spring 35' may be varied by cap nut 36. This arrangement is sufficient to hold the housing 1 stationary upon the guide bar 2 until said friction plates 30—31 or 32—33 are engaged, depending upon the direction in which the quill 6 is traveling. A suitable chuck body 37 is fastened upon the outer end of chuck spindle 8 by a lock nut 38, as clearly shown in Fig. 3.

Referring now to the operation of my improved automatic tapping head: Assume that the device is in the position shown in Fig. 3. Upon examination of this figure, it will be clearly seen that the quill 6 is in the extreme inward position within frame or bed 3 and that the roller 14 is in the low part A of the cam track 13, or, in other words, at the starting point. Then assume that the power means (motor 39) for rotating the spindle shaft 11 and feed cam 12 is turned on. Said roller will be rapidly forced outwardly by that portion of the cam between A and B, which outward motion of said roller is imparted to the quill 6. As the quill 6 moves outwardly it, in turn, moves cover 16, which cover starts to compress the discs 30 against discs 31 and the drag plunger 35 will hold the housing 1 stationary until said discs are fully engaged, at which time said housing 1 will move outwardly at the same speed as that of quill 6. At the same time quill 6 and housing 1 are being moved outwardly by the roller 14 the rotary motion of spindle shaft 11 is transferred to the discs 30 through cover 16, due to the latter being rigidly connected to said spindle shaft by key 17 and to the internal compound gear 18 by bolts 19.

It will, therefore, be seen that the chuck spindle 8 will be caused to rotate in a clockwise direction, which rotary motion is imparted thereto from spindle shaft 11 through cover 16, internal compound gear 18, discs 30—31 and bushing 28. This rotary motion of the chuck spindle 8 is continued until the roller 14 reaches the point C of cam track 13. After said roller reaches the point C of said cam track it is caused to be drawn backwardly within bed 3, thereby drawing said quill 6 backwardly within said bed, which backward motion of said quill releases the pressure previously applied upon discs 30 and 31, thus momentarily severing the drive to chuck spindle 8. The drag plunger 35 at this time holds housing 1 stationary upon guide bar 2 and the compound external gear and clutch member 24 starts to compress or frictionally engage discs 32 with discs 33. When said discs 32 and 33 have been fully compressed said housing 1 will be drawn in a reverse direction, or a direction towards frame 3 and the chuck spindle 8 will be caused to rotate in an anti-clockwise direction, due to the idler gears 21. When the roller 14 reaches point D of the irregular cam track 13, said roller is caused to rapidly return to the position shown in Fig. 3, thereby rapidly returning the quill 6 and the housinig 1 to the starting position shown in Fig. 3. In other words, it will be clearly seen that when the quill 6 is moving in an outward direction relative to frame or bed 3 the spindle shaft 11 is rotated in a clockwise direction, which clockwise rotation is imparted to the chuck spindle 8 through the discs 30 and 31 and when the quill 6 is moved in an inward or reverse direction, said spindle shaft 11 will continue to rotate in a clockwise direction, whereas the chuck spindle 8 will be caused to reverse this rotation or run in an anti-clockwise direction for the purpose of removing the tap from the threaded hole, which reverse of anti-clockwise rotation is accomplished by the means of discs 32—33 and the idler gears 21.

From the foregoing detailed description it will be clearly apparent that the drive to chuck body 37 is automatically accomplished so that said chuck body may be rotated in a clockwise direction during the tapping period and rotated in a reverse or anti-clockwise direction during the time the tap is being withdrawn from the threaded hole.

While I have shown and described one particular embodiment of my invention, it is to be understood that certain changes and modifications can be made without departing from the scope or spirit thereof, as, for example, any suitable means may be employed to drive the spindle shaft 11 and to move the quill in a positive cycle, in place of the drill head shown and described in my said copending application.

Having thus described my invention, what I claim as new and desire to secure by Letters of Patent is:

1. An automatic tapping head of the class described comprising, in combination, a driving shaft, a frame, an arm fixed thereto and extending outwardly therefrom, a housing slidably mounted on said arm, a driven shaft rotatably mounted in the housing, means connecting said driving shaft with said driven shaft, said means including two sets of friction discs and reversing gears, and means carried by said housing and engaging said arm to facilitate the engagement of said discs in the manner specified.

2. An automatic tapping head comprising, in combination with a frame having a driving shaft reciprocably and rotatably mounted therein, a housing, supporting means carried by said frame to slidably support said housing, a driven shaft rotatably mounted in said housing, means connecting said driven shaft with said driving shaft whereby said driven shaft may be rotated in the same direction as said driving shaft and whereby said driven shaft may be rotated in an opposite direction to said driving shaft, and means carried by said housing to frictionally engage said supporting means to facilitate the operation of connecting said driving shaft with said driven shaft.

3. An automatic tapping head comprising, in combination with a frame having a driving shaft reciprocably and rotatably mounted therein, a housing, supporting means carried by said frame to support said housing, a driven shaft rotatably mounted in said housing, and means located within said housing to drive said driven shaft from said driving shaft in clockwise and anti-clockwise directions, said means including two sets of friction discs, a compound external gear and clutch member, a compound internal gear and a plurality of idler gears rotatably mounted upon said housing and in permanent mesh with one of the gears of said compound internal gear and the external gear of said compound external gear and clutch member.

4. An automatic tapping head of the class described, in combination with a frame having a driving shaft reciprocably and rotatably mounted therein, supporting means carried by said frame, a housing slidably mounted upon said supporting means, a driven shaft rotatably mounted in said housing and means carried by said housing whereby said driven shaft may be rotated in the same direction as said driving shaft or rotated in an opposite direction from said driving shaft, depending upon the direction in which said housing is traveling upon said supporting means.

5. An automatic tapping head comprising, in combination with a frame having a driving shaft reciprocably and rotatably mounted therein, a housing, supporting means carried by said frame to slidably support said housing, a driven shaft rotatably mounted in said housing, a compound internal gear fixed to said driving shaft, a compound external gear and clutch member rotatably mounted upon said driven shaft, means carried by said housing to frictionally engage said supporting means to retard its movement thereon, a plurality of idler gears rotatably mounted upon said housing and in permanent mesh with the external gear of said compound external gear and clutch member and with one of the internal gears of said compound internal gear, a plurality of friction discs, alternate ones of which permanently engage one of the gears of said compound internal gear and the remainder of which permanently engage said driven shaft, a second plurality of friction discs, alternate ones of which permanently engage the clutch of said compound external gear and clutch member and the remainder of which permanently engage said driven shaft whereby when said driving shaft is moved outwardly from said frame said compound internal gear will be given a similar movement to compress said first-mentioned plurality of friction plates and thus connect said driving shaft with said driven shaft, both of said shafts being rotated in a clockwise direction and whereby when said driving shaft is moved inwardly within said frame, said compound internal gear will be given a similar movement to release said first-mentioned friction plates and to compress said second-mentioned friction plates whereby said driven shaft is caused to revolve in an opposite direction to said driving shaft, substantially as set forth and for the purposes specified.

SYDNEY C. WATSON.